(12) United States Patent
Wilson et al.

(10) Patent No.: US 7,243,007 B2
(45) Date of Patent: Jul. 10, 2007

(54) CUSTOMIZABLE REMOTE TRANSCEIVER FOR A VEHICLE

(75) Inventors: Shane Wilson, Clinton Township, MI (US); Joseph Santavicca, Macomb, MI (US); John DiCroce, Oceanside, NY (US)

(73) Assignee: Audiovox Corporation, Hauppauge, NY (US)

( * ) Notice: Subject to any disclaimer, the term of this patent is extended or adjusted under 35 U.S.C. 154(b) by 90 days.

(21) Appl. No.: 11/028,813

(22) Filed: Jan. 4, 2005

(65) Prior Publication Data

US 2006/0149431 A1 Jul. 6, 2006

(51) Int. Cl.
*G05D 1/00* (2006.01)

(52) U.S. Cl. .............. 701/2; 701/29; 701/36; 701/211; 340/995.16

(58) Field of Classification Search .......... 701/1, 701/2, 29, 33, 36, 209, 211, 212; 340/995.1, 340/995.16; 342/357.1
See application file for complete search history.

(56) References Cited

U.S. PATENT DOCUMENTS

| 6,289,278 B1 * | 9/2001 | Endo et al. ............... 701/208 |
| 2002/0059368 A1 * | 5/2002 | Reynolds ................ 709/203 |
| 2005/0020305 A1 * | 1/2005 | Callaghan et al. ....... 455/556.2 |

\* cited by examiner

*Primary Examiner*—Gertrude A. Jeanglaude
(74) *Attorney, Agent, or Firm*—F. Chau & Associates, LLC

(57) ABSTRACT

A customizable remote transceiver for communicating with a vehicle control system is provided. A customizable remote transceiver for communicating with a vehicle control system comprises: a first input for receiving a first command; a second input for receiving a second command; a processor for generating a control signal based on one of the first and second commands; a transmitter for transmitting the control signal to the vehicle control system; a receiver for receiving a response to the control signal from the vehicle control system; and a display comprising a display area for displaying a representation of one of the first and second commands and of the response transmitted from the vehicle control system, wherein the display area is customizable according to a user preference.

20 Claims, 6 Drawing Sheets

CUSTOMIZABLE REMOTE TRANSCEIVER FOR A VEHICLE

BACKGROUND OF THE INVENTION

1. Technical Field

The present invention relates to a remote transceiver, and more particularly, to a customizable remote transceiver for communicating with a vehicle control system.

2. Discussion of the Related Art

A remote transmitter is typically used in conjunction with a remote keyless entry (RKE) system to allow a user to lock and unlock vehicle doors and trunks and control alarm systems without the need to use a key. A remote transmitter typically includes a small handheld transmitter housing in the form of a key fob that can be mounted to a user's key chain. One or more small buttons are located on the housing to allow the user to send desired control signals to a receiver in a vehicle.

As RKE systems have become integrated with vehicle control systems, remote transmitters used therewith have been designed to handle additional non-RKE functions. As a result, such remote transmitters include additional switches or buttons while retaining the convenient small size of their predecessors. This, however, has led to remote transmitters having a multitude of finger-operated buttons thus complicating the operation thereof.

In an effort to reduce the proliferation of keys on remote transmitters, remote transmitters have been designed to include a user interface, such as a screen, in combination with a small number of buttons. Such interfaces, however, are typically cluttered with icons associated with available vehicle functions, thus making the transmitter difficult to operate.

In addition to the one-way communication between remote transmitters and vehicle control systems, remote transceivers have been developed for bi-directional communication. In particular, remote transceivers are capable of communicating with vehicle control or security systems while at the same time are able to receive status information associated with such systems. These transceivers, however, are typically bulky, complicated to use, and include cluttered user interface screens.

Accordingly, a need therefore exists for a remote transceiver that includes an uncluttered user interface screen for providing ease of operation.

SUMMARY OF THE INVENTION

The present invention overcomes the foregoing and other problems encountered in the known teachings by providing a customizable remote transceiver for communicating with a vehicle control system.

In one embodiment of the present invention, a customizable remote transceiver for communicating with a vehicle control system comprises: a first input for receiving a first command; a second input for receiving a second command; a processor for generating a control signal based on one of the first and second commands; a transmitter for transmitting the control signal to the vehicle control system; a receiver for receiving a response to the control signal from the vehicle control system; and a display comprising a display area for displaying a representation of one of the first and second commands and of the response transmitted from the vehicle control system, wherein the display area is customizable according to a user preference.

The first input is one of a plurality of buttons and switches. The second input is a microphone. The microphone is coupled to a voice recognition circuit for recognizing the second command and for transmitting the second command to the processor. The second input is capable of receiving multilingual second commands.

The display is one of a liquid crystal display (LCD), light emitting diode (LED) array, organic light-emitting diode (OLED) graphic display, plasma display, glasses-free three-dimensional (3D)-enabled display, aluminum gallium arsenide (AlGaAs) LED array, and liquid crystal on silicon (LCoS) micro display. The display area is one of a dot matrix display area and graphic display area. The display area is capable of displaying multilingual representations of one of the first and second commands and of the response transmitted from the vehicle control system.

The user preference is associated with one of sound, color, background, language, size of one of text and an icon, and location of one of the text and icon of the display area.

The remote transceiver further comprises a memory interface for interfacing with a memory card, a housing for housing the first and second inputs, processor, transmitter, receiver, display, memory interface, and a key.

The first and second commands are associated with one of arming, disarming, locking doors, unlocking doors, remote starting, remote stopping, closing a trunk, opening the trunk, requesting status data, image data and diagnostic data of a vehicle and customizing the display area.

The representation of one of the first and second commands and of the response transmitted from the vehicle control system are displayed in one of text and an icon.

In another embodiment of the present invention, a system for communicating with a vehicle comprises: a customizable remote transceiver, comprising: a first input; a second input; a processor for generating a control signal based on an input received from one of the first and second inputs; a transceiver for transmitting the control signal to a vehicle control system and receiving a response to the control signal from the vehicle control system; and a display comprising a customizable display area for displaying a representation of the input received from one of the first and second inputs and of the response transmitted from the vehicle control system; and a vehicle control system comprising: a transceiver for receiving the control signal and for transmitting a response to the control signal; and a controller for controlling electronic input and output devices of the vehicle over a data bus in response to the control signal.

The second input comprises a microphone coupled to a voice recognition circuit, wherein the second input is capable of receiving multilingual second commands. The display area is a dot matrix display area capable of displaying multilingual representations of one of a first command and second command and of the response transmitted from the vehicle control system.

The electronic input and output devices are one of a door lock, trunk lock, alarm sensor, hood lock, tachometer, impact sensor, ignition control, heater control, air conditioner control, external lights, horn, siren, dome-light, defroster, window, starter, and fuel door switch.

The vehicle control system further comprises an interface module for interfacing with one of the electronic input and output devices over the vehicle data bus, wherein the electronic input and output devices are operated pursuant to a feature set of electronically operable functions associated with the control signal; and a feature set module for detachably coupling to the interface module, wherein the feature set module comprises codes for defining the feature set of electronically operable functions.

In yet another embodiment of the present invention, a method for communicating with a vehicle control system using a customizable a remote transceiver comprises: receiving a first command from a user, wherein the first command is associated with a vehicle operation; transmitting the first command to the vehicle control system; receiving a response to the first command from the vehicle control system; and displaying one of a representation of the first command and of the response transmitted from the vehicle control system on a display area of a display, wherein the display area is customizable according to a user preference.

The method further comprises receiving a second command from the user, wherein the second command is associated with the user preference for customizing the display area; and modifying the display area in response to the second command.

The foregoing features are of representative embodiments and are presented to assist in understanding the invention. It should be understood that they are not intended to be considered limitations on the invention as defined by the claims, or limitations on equivalents to the claims. Therefore, this summary of features should not be considered dispositive in determining equivalents. Additional features of the invention will become apparent in the following description, from the drawings and from the claims.

DETAILED DESCRIPTION OF EXEMPLARY EMBODIMENTS

Figure 1:
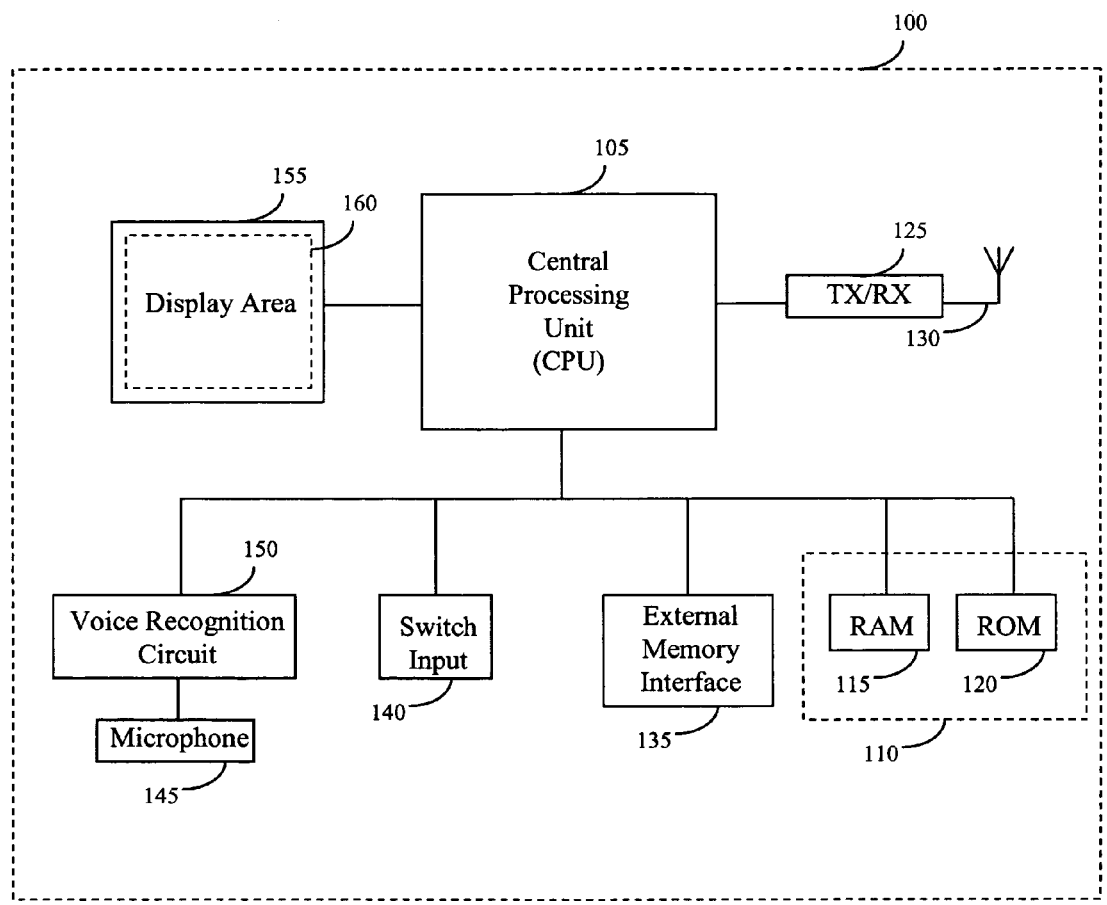
FIG. 1 is a block diagram of a customizable remote transceiver for communicating with a vehicle control system according to an exemplary embodiment of the present invention.

FIG. 1 illustrates a customizable remote transceiver 100 for communicating with a vehicle control system according to an exemplary embodiment of the present invention. As shown in FIG. 1, the remote transceiver 100 includes a central processing unit (CPU) 105 coupled to a memory 110. The memory 110 includes a random access memory (RAM) 115 and a read only memory (ROM) 120. The memory 110 can also include a database, electrically erasable programmable read only memory (EEPROM), or a combination thereof. The CPU 105 processes data provided to it and controls components of the remote transceiver 100. The RAM 115 functions as a data memory that stores data used during execution of a program in the CPU 105 and is used as a work area. The ROM 120 functions as a program memory for storing a program executed in the CPU 105.

A transceiver 125 and an antenna 130 are also coupled to the CPU 105. The transceiver 125 includes a transmitter and a receiver housed together for performing transmitting and receiving functions respectively. An external memory interface 135 is further coupled to the CPU 105. The external memory interface 135 is, for example, a memory card interface for enabling the remote transceiver 100 to be upgraded with new functions and/or features associated with the remote transceiver 100 or a vehicle control or security system. It is to be understood that the external memory interface 135 could be a universal serial bus (USB), Ethernet, FireWire, infrared (IR) or Bluetooth interface for receiving and in some cases requesting updated functions and/or features to be used by the remote transceiver 100.

As further shown in FIG. 1, the remote transceiver 100 includes a button or switch type input 140 and a microphone input 145, which is connected to a voice recognition circuit 150. The button or switch type input 140 may include buttons, switches, a keypad, scroll wheels or a combination thereof, and is employed by a user to perform certain functions on and with the remote transceiver 100. The microphone 145 is capable of receiving voice commands spoken by a user and may also be employed by a user to execute certain functions on the remote transceiver 100. The voice recognition circuit 150 is used to recognize the voice command received from the microphone 145 and enable generation of a control signal by the CPU 105 in response thereto. The voice recognition circuit 150 is also capable of recognizing voice commands in more than one language such as English, Spanish, or French.

Also shown in FIG. 1 is a display 155 connected to the CPU 105. The display 155, which may be a liquid crystal display (LCD), light emitting diode (LED) array, organic light-emitting diode (OLED) graphic display, plasma display, glasses-free three-dimensional (3D)-enabled display, aluminum gallium arsenide (AlGaAs) LED array, and a liquid crystal on silicon (LCoS) micro display, includes a dot-matrix display area 160 or a graphic area for displaying information thereon in either text or icons. The display area 160 is menu-driven and user customizable and will be discussed in detail hereinafter with reference to FIGS. 2–5B.

Figure 2:
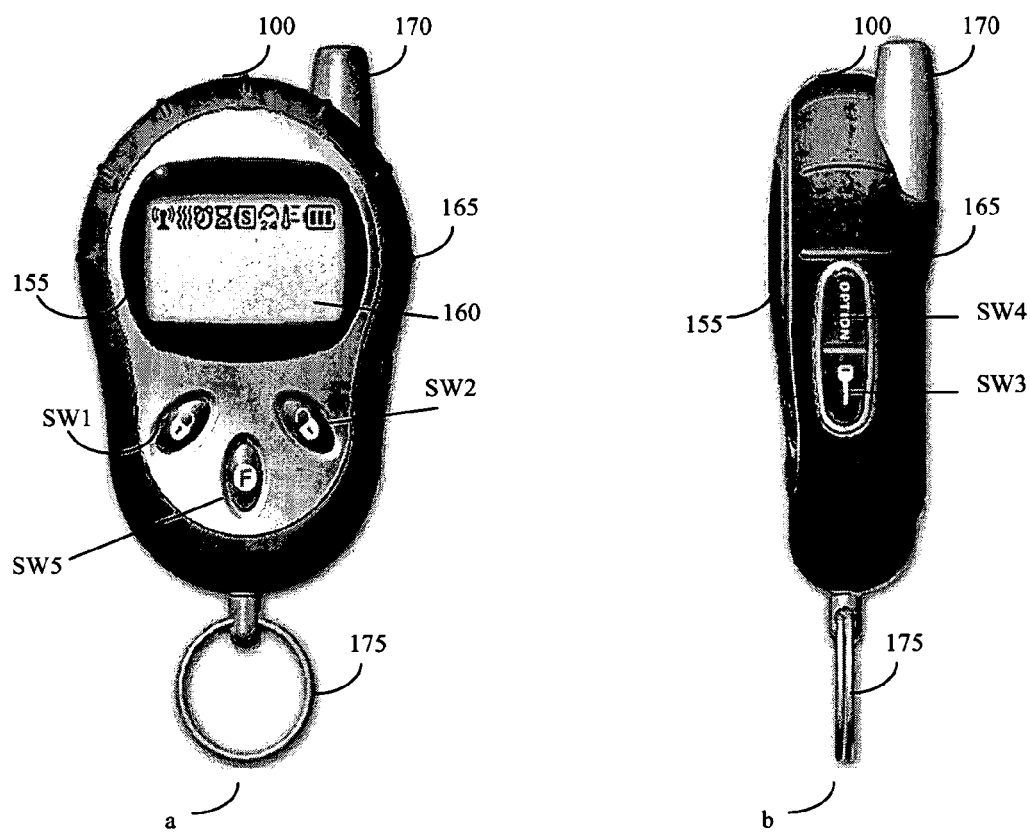
FIG. 2 illustrates a front and side view of the customizable remote transceiver of FIG. 1.

FIG. 2 illustrates a front (a) and side (b) view of the remote transceiver 100 according to an exemplary embodiment of the present invention. As shown in FIG. 2, the remote transceiver 100 has a housing 165 in the form of an outer shell, the LCD display 155 including the dot-matrix display area 160, an antenna case 170, which includes the transceiver 125 and antenna 130, the input 140 in the form of buttons SW1–5, and a key holder 175.

Each of the buttons SW1–5 or combinations thereof are used to program or execute certain functions on the remote transceiver 100 or in a vehicle. For example, the buttons SW1–5 can be used to execute certain vehicle functions such as arming or disarming a vehicle security system, locking or unlocking vehicle doors, opening a vehicle trunk or a fuel door, remote starting and stopping, and requesting the status of selected vehicle components. An example of some of the vehicle functions that may be performed by pressing one or a combination of the buttons SW1–5 is shown below in Table 1.

TABLE 1

| BUTTON | FUNCTION | DISPLAY DURING TRANS- MISSION | DISPLAY |
| --- | --- | --- | --- |
| SW1 | ARM/LOCK | «♨» | ARMED/LOCKED |
| SW1 | LOCK | «♨» | LOCKED |
| SW1 PUSH & HOLD 3.5 s | PANIC | «♨» | PANIC ACTIVE or PANIC STOPPED |
| SW2 | UNLOCK/ DISARMED | «♨» | DISARMED/ UNLOCKED |
| SW2 PUSH & HOLD 3.5 s | PANIC | «♨» | PANIC ACTIVE or PANIC STOPPED |
| SW3 PUSH & HOLD 3 s | TRUNK OUTPUT | «♨» | TRUNK RELEASE ACTIVATED |
| SW3 DOUBLE PRESS | REMOTE/ START/ STOP | «♨» | REMOTE START ACTIVATED or DEACTIVATED |
| SW4 | CHANNEL 4 OUTPUT | «♨» | CHANNEL 4 ACTIVATED |
| SW1 & SW4 | AWD | «♨» | ARMED/LOCKED - ENGINE RUNNING |
| Not set | SILENT ALARM | «♨» | SILENT ALARM/ LOCK |
| Not set | CH5–CH7 | «♨» | CH5–CH7 ACTIVATED |

As shown in Table 1, if the button SW1 is pressed the vehicle function to be performed will be that of arming a vehicle security system by locking the vehicle doors as indicated by the "ARM/LOCK" function. At this time, the display area 160 will display an icon "«♨»" or the text "TRANSMITTING" or both to indicate that the "ARM/LOCK" command has been sent to the vehicle. Once the vehicle security system has been armed and its doors locked, the display area 160 will display the text "ARMED/LOCKED" to indicate that the vehicle security system is armed and the vehicle's doors are locked.

Although the buttons SW1–5 are configured, for example, by a manufacturer to perform the functions listed in Table 1, it is to be understood that the buttons SW1–5 may be (1) configured to perform additional functions and (2) reconfigured so that they can perform functions according to a user's preference. For example, the buttons SW1–5 can be configured to perform additional functions or reconfigured according to a user's preference by a user accessing a menu on the display area 160 associated with button configuration, reconfiguring the functions to be performed by the buttons SW1–5, by, for example, scrolling through the menu and selecting functions to be performed by the buttons SW1–5, and then storing data associated with the reconfigured button SW1–5 arrangement in the memory 110 of the remote transceiver 100.

Figure 3A:
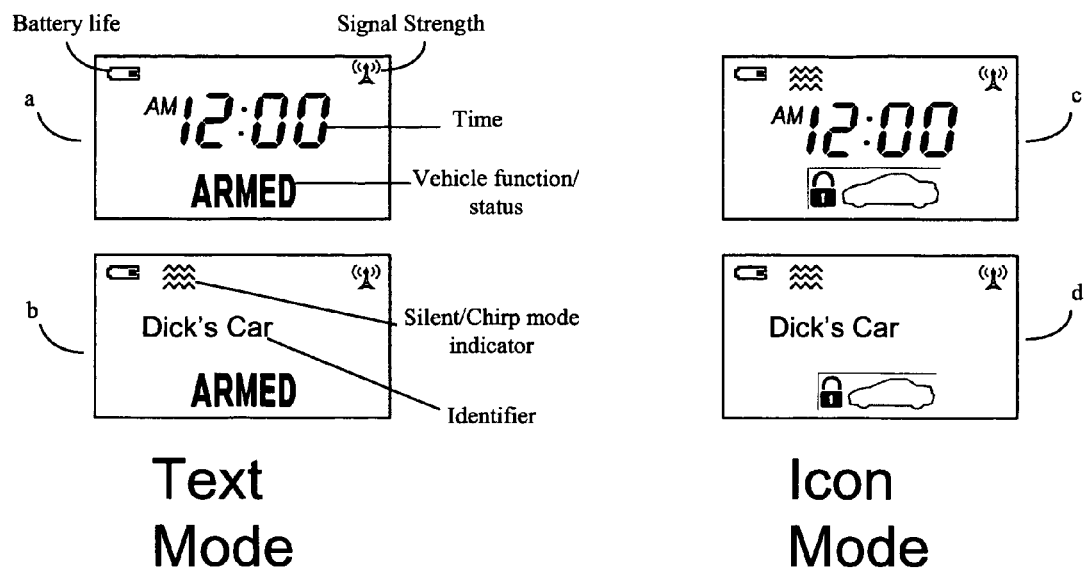
FIG. 3A illustrates a display area of the customizable remote transceiver of FIG. 1.

FIG. 3A illustrates the display area 160. In particular, FIG. 3A shows various configurations of a homepage on the display area 160 that can be customized according to a user's preference. As shown, for example in text mode image (a), the homepage can be configured to display time, battery life, transmission signal strength, and current status of a vehicle system or component or function being performed, or as shown in text mode image (b), the battery life, a silent or chirp mode indicator, signal strength, and the user's home page identifier. As further shown in FIG. 3A, icon mode images (c) and (d) include vehicle lock icons corresponding to the "ARMED" status indicators in the text mode images (a) and (b).

Figure 3B:
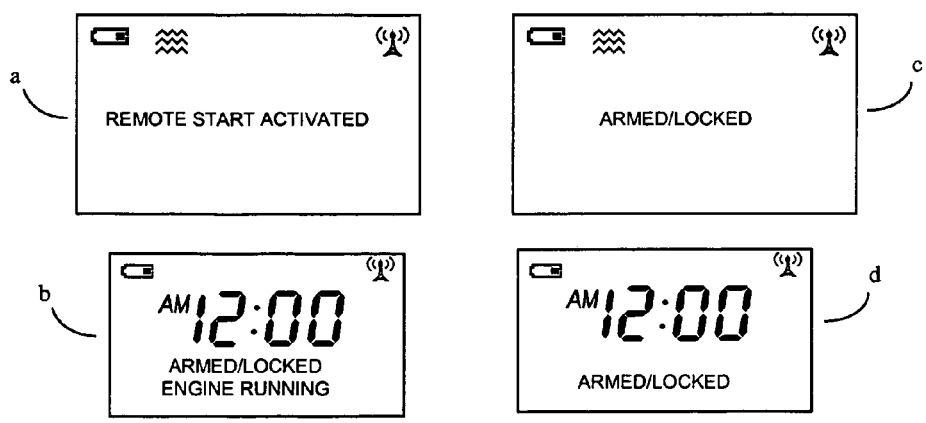
FIG. 3B illustrates a variant of the display area of the customizable remote transceiver of FIG. 1.

FIG. 3B illustrates another variant of the display area 160. More specifically, FIG. 3B shows in image (a) a text message "REMOTE START ACTIVATED" indicating that the remote start function of a vehicle has been activated in response to a user pressing, for example, the button SW3 twice. Image (b) in FIG. 3B is a view of the display area 160 after, for example, five seconds have passed since the user requested activation of the remote start function. As shown in image (b), the display area 160 reverts to either a default or a user-configured homepage, either of which indicates the status of the vehicle by displaying the text "ENGINE RUNNING". Similar to images (a) and (b), image (c) of FIG. 3B illustrates a function being performed by displaying the text "ARMED/LOCKED" and image (d) of FIG. 3B illustrates a default or user-configured homepage after the function has been performed with text "ARMED/ LOCKED", either of which indicates that the function has been performed.

Figure 4A:
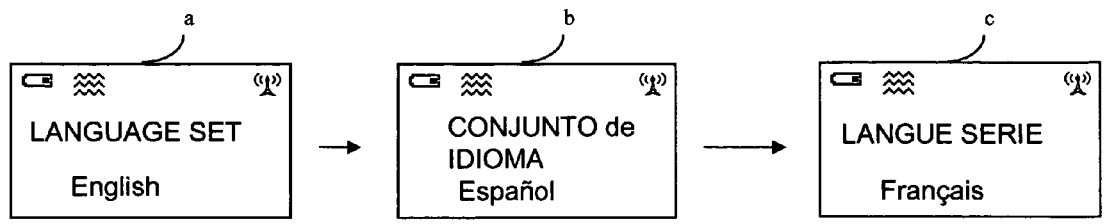
FIG. 4A illustrates additional variants of the display area of the customizable remote transceiver of FIG. 1.
Figure 4B:
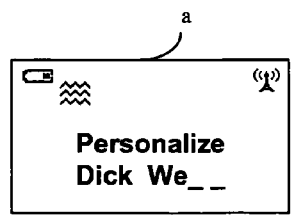
FIG. 4B illustrates another variant of the display area of the customizable remote transceiver of FIG. 1.

FIG. 4A illustrates yet another variant of the display area 160. In particular, FIG. 4A illustrates several options in images (a), (b), and (c) for setting the language to be used by the remote transceiver 100. FIG. 4B illustrates a variant of the display area 160 when, for example, a user is personalizing their homepage to display their name in text.

Similar to the technique used to configure the buttons SW1–5, the homepage and other features and/or functions to be displayed on the display area 160 may be configured to a default setting by the remote transceiver's 100 manufacturer or a vendor. Once in the possession of a user, however, the user may then reconfigure the remote transceiver 100 to suit their needs and/or preferences. This is accomplished, for example, by first accessing a menu on the display area 160 and scrolling through the menu to determine which portion of the remote transceiver 100 they desired to modify. Thus, if a user were to select the homepage to modify, the menu would then offer to the user a variety of choices and display area 160 configurations from which to choose from. Once the user makes their desired selections they may then store their homepage configuration in the remote transceiver's 100 memory 110 and modify the configuration by repeating the steps just described.

In order to be able to configure the homepage to illustrate the data as shown for example in FIGS. 3A–4B, the memory 110 of the remote transceiver 100 must be programmed. This is typically accomplished by the manufacturer of the remote transceiver 100. However, this may also be accomplished by an end user or a vendor by wirelessly programming the remote transceiver 100 via the transceiver 125 or by inserting a memory card, memory stick, Ethernet connector, or universal serial bus (USB) connector into the external memory interface 135. It is to be understood that the memory 110 may be programmed in more than one language.

An example of some of the functions that may be programmed into the memory 110 is shown below in Table 2. As shown in Table 2, the memory 110 can be programmed such that when, for example, a "SHOCK SENSOR" is triggered the text "VEHICLE VIOLATION-IMPACT" is displayed on the homepage of the display area 160. As further shown in Table 2, concurrent with the display of the text, music can be played, the remote transceiver 100 can be made to vibrate, or the text on the display area 160 can be made to flash for a period of, for example, ten seconds.

TABLE 2

| HOMEPAGE | TRIGGER TYPE | DISPLAY TEXT - MUSIC OR VIBRATE FOR 10 SECONDS - TEXT FLASHING |
| --- | --- | --- |
| HOMEPAGE | IGN TRIGGER | VEHICLE VIOLATION - IGN |
| HOMEPAGE | DOOR TRIGGER | VEHICLE VIOLATION - DOOR |
| HOMEPAGE | HOOD TRIGGER | VEHICLE VIOLATION - HOOD |
| HOMEPAGE | INSTANT TRIGGER | VEHICLE VIOLATION - AUX |
| HOMEPAGE | SHOCK SENSOR | VEHICLE VIOLATION - IMPACT |
| HOMEPAGE | PREWARN TRIGGER | SHOCK SENSOR PRE DETECT |

Another example of further functions that can be programmed into the memory 110 is shown below in Table 3. In particular, the memory 110 can be programmed such that when, for example, after an alarm trigger times out and the remote transceiver 100 is armed and reset, if a "SHOCK SENSOR" were triggered, the text "ARMED/LOCKED-IMPACT VIOLATION" would be displayed on the display area 160. As further shown in Table 3, the display area 160 could play music, flash text, or the remote transceiver 100 could vibrate.

TABLE 3

| TRIGGER TYPE | LCD DISPLAY TEXT AFTER ALARM RESET - MUSIC OR VIBRATE FOR 10 SECONDS - TEXT FLASHING |
| --- | --- |
| IGN TRIGGER | ARMED/LOCKED - IGN VIOLATION |
| DOOR TRIGGER | ARMED/LOCKED - DOOR VIOLATION |
| HOOD TRIGGER | ARMED/LOCKED - HOOD VIOLATION |
| INSTANT TRIGGER | ARMED/LOCKED - AUX VIOLATION |
| SHOCK SENSOR | ARMED/LOCKED - IMPACT VIOLATION |
| PREWARN TRIGGER | ARMED/LOCKED - PRE DETECT |

Figure 5A:
FIG. 5A illustrates yet further variants of the display area of the customizable remote transceiver of FIG. 1.

FIG. 5A illustrates the display area 160 when its homepage was programmed using data from, for example, Tables 2 and 3. More specifically, if a vehicle door is breached, the text "VEHICLE VIOLATION-DOOR" is displayed on the display area 160 as shown in image (a). Similarly, after the event has lasted a period of, for example, ten seconds, the default homepage screen would reappear on the display area 160 with the text "ARMED/LOCKED-DOOR VIOLATION" as shown in image (b).

Figure 5B:
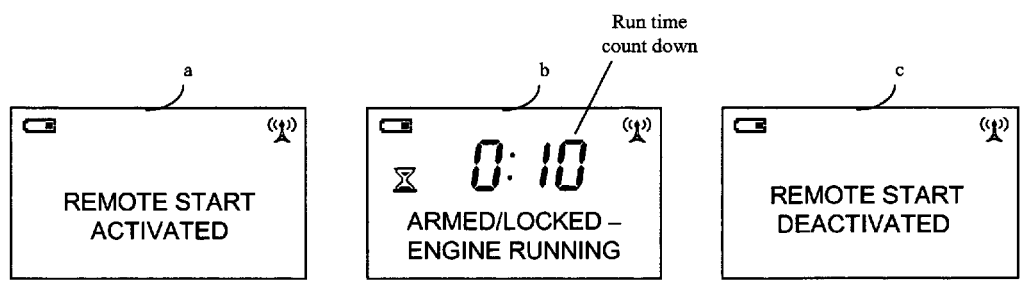
FIG. 5B illustrates additional variants of the display area of the customizable remote transceiver of FIG. 1.

FIG. 5B illustrates the display area 160 when a remote start process takes place. For example, image (a) shows that the remote start is activated by displaying the text "REMOTE START ACTIVATED". At this time, music or some other means for indicating that the remote starting process has begun can be initiated. During the remote start process, the homepage can display a run time count down as shown in image (b). The remote transceiver 100 can be configured such that when pressing a switch, for example, the button SW1, the real time clock (e.g., the time) can be retrieved and viewed on the display area 160 in place of the count down timer.

An example of a remote shutdown function that may be programmed into the memory 110 is shown below in Table 4. As shown in Table 4, the memory 110 can be programmed such that when, for example, a remote start shutdown process begins a "BRAKE TRIGGER" is triggered and the text "REMOTE START SHUTDOWN-BRAKE" is displayed on the homepage of the display area 160. As further shown in Table 4, music can be played, the remote transceiver 100 can be made to vibrate, or the text can be made to flash.

TABLE 4

| HOMEPAGE | REMOTE SHUTDOWN TRIGGER | LCD DISPLAY TEXT - MUSIC OR VIBRATE FOR 10 SECONDS - TEXT FLASHING |
| --- | --- | --- |
| HOMEPAGE | BRAKE TRIGGER | REMOTE START SHUTDOWN - BRAKE |
| HOMEPAGE | DOOR TRIGGER | REMOTE START SHUTDOWN - DOOR |
| HOMEPAGE | HOOD TRIGGER | REMOTE START SHUTDOWN - HOOD |
| HOMEPAGE | INSTANT TRIGGER | REMOTE START SHUTDOWN - AUX |
| HOMEPAGE | INHIBIT SWITCH | REMOTE START SHUTDOWN - INHIBIT |

In another exemplary embodiment of the present invention, the remote transceiver 100 can be programmed to display various colors indicating different types of vehicle violations or functions being performed. In addition, user homepages can be programmed to have specific backgrounds, additional or limited amounts of text and icons. Further, the display area 160 can be configured in many different ways and several display area 160 user-specific configurations can be stored in the memory 110 so that the remote transceiver 100 can be used by more than one person. Moreover, the user-specific configurations could be designed such that they are only accessible and reconfigurable via password.

Figure 6:
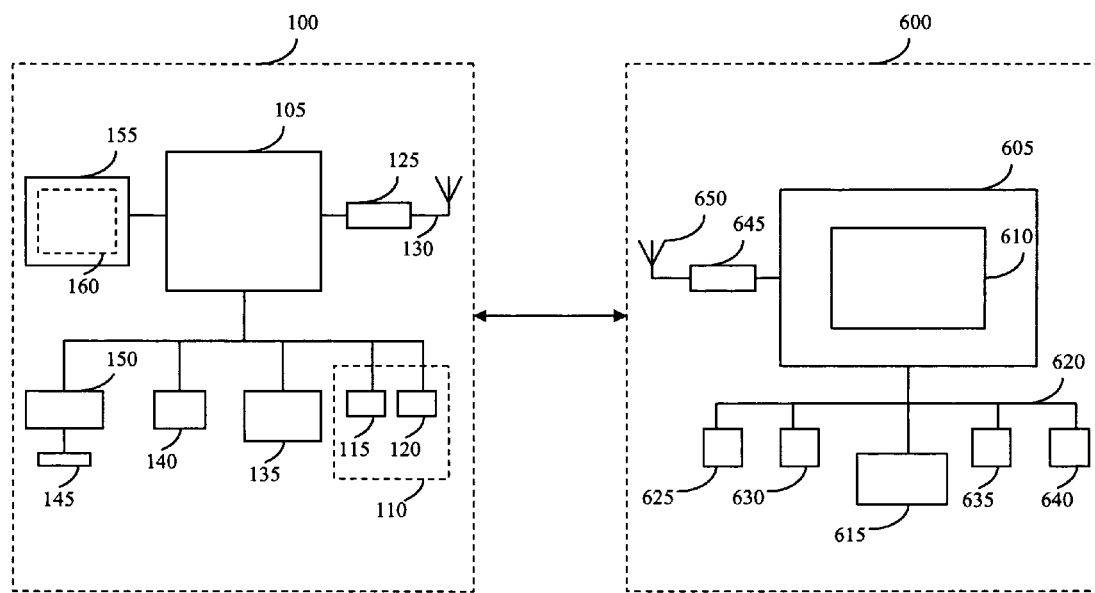
FIG. 6 is a block diagram of a system for communicating with a vehicle according to another exemplary embodiment of the present invention.

FIG. 6 illustrates a system for communicating with a vehicle according to another exemplary embodiment of the present invention. In particular, FIG. 6 shows the customizable remote transceiver 100 of FIG. 1 and a vehicle control system 600 in communication with each other.

As shown in FIG. 6, the vehicle control system includes a base module 605 coupled to a vehicle controller 615 and electronic input and output devices 625, 630, 635, and 640 via a vehicle data bus 620. The base module 605 includes a feature set module 610, a transceiver 645 and an antenna 650 coupled thereto. The base module 605 is used to operate the electronic input and output devices 625, 630, 635, and 640 using a feature set of electronically operable functions. The feature set module 610 includes codes for defining the feature set of electronically operable functions.

The electronic input and output devices 625, 630, 635, and 640 may be for example, input devices such as an ignition switch, an ignition key sensor, zone sensors, trunk, hood and door pin sensors or switches, door lock switches, a pre-warn sensor, and a valet switch and output devices such as auxiliary relay outputs for window control, remote starting, or remote alarm indication, a siren, lights, LEDs, a valet LED, a dome light, a central lock relay or lock control unit, a starter kill circuit, and an armed relay output. Additional outputs may include an audible tone generator, an alphanumeric display, a speech message enunciator, and a vibration transducer. The vehicle data bus 620 may be, for example, a controller area network (CAN) vehicle data bus.

As further shown in FIG. 6, the remote transceiver 100 can be used to wirelessly communicate with the vehicle control system 600. This is accomplished, for example, by entering a command via one of remote transceiver's 100 inputs 140 and 145 and transmitting the command to the vehicle control system 600 using the remote transceiver's 100 transceiver 125. The command can be any variety of commands associated with vehicle control or vehicle security such as arming, disarming, locking doors, unlocking doors, remote starting, remote stopping, closing a trunk, opening the trunk, requesting status data, image data and diagnostic data.

If, for example, status data is requested from the vehicle control system 600, the vehicle control system 600 will transmit a response to the remote transceiver 100 using its transceiver 645. Thus, if a user requested data associated with engine oil level, the vehicle control system 600 could respond "oil level good" or "oil level low". Similarly, the remote transceiver 100 could be programmed to periodically query the vehicle control system 600 for such information. In addition, the remote transceiver 100 could also be programmed to receive status information from the vehicle control system 600 even when not requested.

During the process of communication between the remote transceiver 100 and vehicle control system 600, the commands transmitted to the vehicle control system 600 are displayed in either a text or an icon mode on the display area 160 either in a default manner or in accordance with a user's preference. Similarly, the response received from the vehicle control system 600 is also displayed on the display area 160 in a default manner or in accordance with a user's preference.

Thus, in accordance with an exemplary embodiment of the present invention, a user or manufacturer can customize the remote transceiver's 100 display area 160 to display information in text or icons and in a manner that provides a less cluttered user interface thereby enabling a user to more easily view and retrieve information on and with the remote transceiver 100. In addition, by providing multilingual input and voice recognition means and multilingual programming capability the remote transceiver 100 is capable of being used in a number of countries throughout the world.

Further, although the exemplary embodiments of the present invention were directed to communication between a remote transceiver and a vehicle control system, it is to be understood that the remote transceiver disclosed herein could be used to communicate with a variety of control systems such as those employed by home entertainment and security systems, home appliance management systems and inventory control systems. In addition, the remote transceiver according to the present invention could also include a key, for example, an ignition key, integrated into its housing to form a key-head transceiver.

It should be understood that the above description is only representative of illustrative embodiments. For the convenience of the reader, the above description has focused on a representative sample of possible embodiments, a sample that is illustrative of the principles of the invention. The description has not attempted to exhaustively enumerate all possible variations. That alternative embodiments may not have been presented for a specific portion of the invention, or that further undescribed alternatives may be available for a portion, is not to be considered a disclaimer of those alternate embodiments. Other applications and embodiments can be straightforwardly implemented without departing from the spirit and scope of the present invention.

It is therefore intended that the invention not be limited to the specifically described embodiments, because numerous permutations and combinations of the above and implementations involving non-inventive substitutions for the above can be created, but the invention is to be defined in accordance with the claims that follow. It can be appreciated that many of those undescribed embodiments are within the literal scope of the following claims, and that others are equivalent.

What is claimed is:

1. A customizable remote transceiver for communicating with a vehicle control system, comprising:
    a first input for receiving a first command;
    a second input for receiving a second command;
    a processor for generating a control signal based on one of the first and second commands;
    a transmitter for transmitting the control signal to the vehicle control system;
    a receiver for receiving a response to the control signal from the vehicle control system; and
    a display comprising a display area for displaying information in a plurality of different display configurations, each of the plurality of different display configurations corresponding to one of a plurality of different functions performed by the vehicle control system, wherein the plurality of different display configurations are customized according to user selections from a list of display options presented in a menu on the display area.

2. The remote transceiver of claim 1, wherein the first input is one of a plurality of buttons and switches.

3. The remote transceiver of claim 1, wherein the second input is a microphone.

4. The remote transceiver of claim 3, wherein the microphone is coupled to a voice recognition circuit for recognizing the second command and for transmitting the second command to the processor.

5. The remote transceiver of claim 1, wherein the second input receives a multilingual second command.

6. The remote transceiver of claim 1, wherein the display is one of a liquid crystal display (LCD), light emitting diode (LED) array, organic light-emitting diode (OLED) graphic display, plasma display, glasses-free three-dimensional (3D)-enabled display, aluminum gallium arsenide (AlGaAs) LED array, and liquid crystal on silicon (LCoS) micro display.

7. The remote transceiver of claim 1, wherein the display area is one of a dot matrix display area and graphic display area.

8. The remote transceiver of claim 1, wherein the display area displays a multilingual version of the information.

9. The remote transceiver of claim 1, wherein the user selection is associated with one of sound, color, background, language, size of one of text and an icon, and location of one of the text and icon on the display area.

10. The remote transceiver of claim 1, further comprising: a memory interface for interfacing with a memory card.

11. The remote transceiver of claim 1, further comprising: a housing for housing the first and second inputs, processor, transmitter, receiver, display, and a key.

12. The remote transceiver of claim 1, wherein one of the first and second commands are associated with one of arming, disarming, locking doors, unlocking doors, remote starting, remote stopping, closing a trunk, opening the trunk, requesting status data, image data and diagnostic data of a vehicle and customizing the display area.

13. The remote transceiver of claim 1, wherein the information is displayed in one of text and an icon.

14. A system for communicating with a vehicle, comprising:
    a customizable remote transceiver, comprising: a first input; a second input; a processor for generating a control signal based on an input received from one of the first and second inputs; a transceiver for transmitting the control signal to a vehicle control system and receiving a response to the control signal from the vehicle control system; and a display comprising a customizable display area for displaying information in a plurality of different display configurations, each of the plurality of different display configurations corresponding to one of a plurality of different functions performed by the vehicle control system, wherein the plurality of different display configurations are customized according to user selections from a list of display options presented in a menu on the display area; and a vehicle control system comprising: a transceiver for receiving the control signal and for transmitting a response to the control signal; and a controller for controlling electronic input and output devices of the vehicle over a data bus in response to the control signal.

15. The system of claim 14, wherein the second input comprises a microphone coupled to a voice recognition circuit, wherein the second input is capable of receiving a multilingual second command.

16. The system of claim 14, wherein the display area is a dot matrix display area that displays multilingual representations of the information.

17. The system of claim 14, wherein the electronic input and output devices are one of a door lock, trunk lock, alarm sensor, hood lock, tachometer, impact sensor, ignition control, heater control, air conditioner control, external lights, horn, siren, dome-light, defroster, window, starter, and fuel door switch.

18. The system of claim 14, wherein the vehicle control system further comprises:

an interface module for interfacing with one of the electronic input and output devices over the vehicle data bus, wherein the electronic input and output devices are operated pursuant to a feature set of electronically operable functions associated with the control signal; and a feature set module for detachably coupling to the interface module, wherein the feature set module comprises codes for defining the feature set of electronically operable functions.

19. A method for configuring a display area of a remote transceiver for a vehicle, comprising:

presenting a list of display options in a menu on the display area;

receiving a first selection indicating a first display option to include in the display area when the vehicle is performing a first function;

receiving a second selection indicating a second display option to include in the display area when the vehicle is performing a second function; and configuring the display area according to the first selection when the vehicle performs the first function and configuring the display area according to the second selection when the vehicle performs the second function.

20. The remote transceiver of claim 1, wherein the information includes representations of one of the first command, the second command and the response transmitted from the vehicle control system.

* * * * *